Oct. 16, 1923.  
H. JOHNSON  
SEWAGE DISPOSAL APPARATUS  
Filed Dec. 1, 1922  
1,470,745  
2 Sheets-Sheet 1

Witnesses  
Harold W. Eaton  
Anna Murphy

Inventor  
Hans Johnson  
By Clayton L. Jenks  
Attorney

Oct. 16, 1923.　　　　　　　　　　　　　　　　　　　　1,470,745
H. JOHNSON
SEWAGE DISPOSAL APPARATUS
Filed Dec. 1, 1922　　　　　　2 Sheets-Sheet 2

Witnesses
Harold W. Eaton
Anna Murphy

Inventor
Hans Johnson
By Clayton R. Jenks
Attorney

Patented Oct. 16, 1923.

1,470,745

UNITED STATES PATENT OFFICE.

HANS JOHNSON, OF PORT JEFFERSON STATION, NEW YORK.

SEWAGE-DISPOSAL APPARATUS.

Application filed December 1, 1922. Serial No. 604,235.

*To all whom it may concern:*

Be it known that I, HANS JOHNSON, a citizen of the United States of America, residing at Port Jefferson Station, in the county of Suffolk and State of New York, have invented certain new and useful Improvements in a Sewage-Disposal Apparatus, of which the following is a full, clear, and exact specification.

My invention relates to a sewage disposal apparatus and more particularly to a septic tank for the purification of sewage by sedimentation and the action of anerobic bacteria.

In apparatus of this type, sewage is purified by the action of micro-organisms, such as anerobic bacteria, which propagate out of contact with light and air and convert the polluted water carrying objectional organic material to a purified form. Such an apparatus ordinarily comprises a septic tank sunk beneath the surface of the ground where the liquid may be permitted to stand and the solid matter settle out by sedimentation and the whole mass digested by bacterial action. The purified liquid is drawn off from the settling chamber and permitted to soak away into the adjacent porous earth.

It is the prime object of my invention to provide a simplified and economically built sewage disposal apparatus which is suitable for use in various types of earth formations and will serve to dispose of sewage efficiently and for a long period of time.

With this and further objects in view, as will be apparent from the following disclosure, my invention resides in the combination of parts set forth in the specification and covered by the claims appended hereto.

Referring to the drawings in which like reference numerals indicate like parts:—

Figure 1:
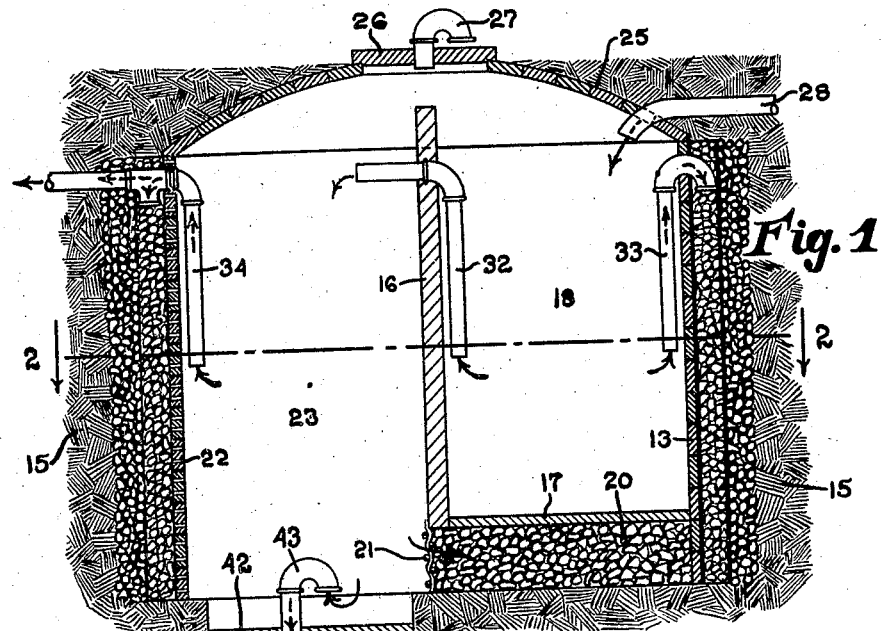
Fig. 1 is a vertical cross section of one form of tank which my invention may comprise.
Figure 2:
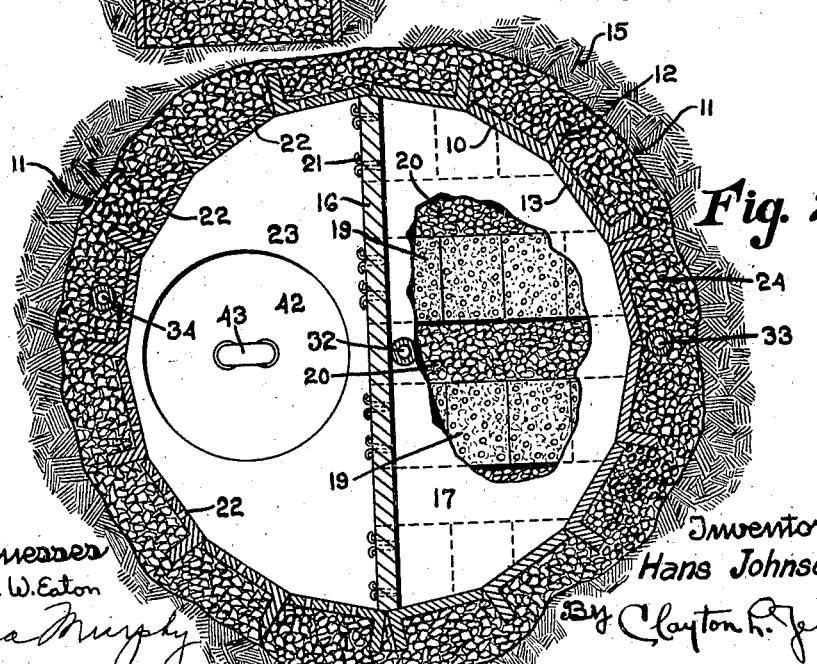
Fig. 2 is a section, partly broken away, on the line 2—2 of Fig 1.

Referring to Figs. 1 and 2 of the drawings, I have shown a sewage disposal apparatus comprising an outer wall 10, built in accordance with the usual methods of masonry, which may be substantially cylindrical in shape and form a bottomless septic tank resting on the ground. This wall is built in a pit dug in the ground in accordance with the usual procedure, the enclosing earth wall 11 of the pit being made of a considerably greater diameter than that of the tank 10, for a purpose to be described. The outer wall of the tank is preferably made of L-shaped concrete blocks, as shown particularly in Fig. 2, which are laid with the shorter legs 12 projecting outwardly and the longer legs 13 forming a substantially smooth inner face for the tank. The outer legs 12, which serve as strengthening abutments for the tank wall, provide vertical spaces therebetween, bordered by the earth wall 11. These spaces are filled with gravel or equivalent material and thereby from an outside reservoir which has direct access to the earth 15 for any water therein to soak away. The vertical abutments or ribs serve to limit and define the transfusion zone.

In order to form an impervious chamber for the bacterial digestive action, I make the right hand half of the wall 10 of solid blocks, as shown in Fig. 2, and build a solid partition 16 diametrically across the tank. Since the walls 10 rest on the earth bottom as indicated in Fig. 1, I also provide an impervious bottom 17 of concrete or other suitable material, and thereby form an open topped sedimentation and purification chamber 18 where the impure fluids may remain quiescent for a considerable period of time and until bacterial action has accomplished its ends. This bottom 17 and the wall 16 are disposed at a considerable distance above the earth bottom of the pit and are preferably supported on blocks 19 laid in spaced rows transversely of the pit, the spaces 20 therebetween being likewise filled with gravel or the like. A course meshed galvanized wire fabric 21 is fastened to the wall 16 and the end blocks 19 by suitable means such as tie wires embedded in the concrete blocks. This fabric 21 serves to hold the gravel placed in the rear thereof between the blocks 19 and beneath the floor 17.

The L-shaped blocks at the left hand side of the tank, as illustrated in Fig. 2, are provided with perforations 22 therethrough, which permit egress of water from the compartment 23 formed by the partition 16 and the tank wall 10, whereby water may readily flow into the gravel filled annular zone 24 outside of the tank. An arched cover 25 is suitably built over the tank walls 10 to exclude light and air, and for the purpose of obtaining entrance to the interior of the tank a removable cover plate 26 is provided. A pipe 27 which has a downwardly turned goose neck serves for the exit of gases generated within the tank but does not admit light thereto.

An inlet pipe 28 is provided for the admission of sewage to the compartment 18 where the bacterial action takes place. A tile pipe 32 passing through the partition 16 near its upper end and projecting part way down into compartment 18 serves to carry fluid from the sedimentation chamber 18 of the tank to the storage reservoir 23 from which the liquid material may gradually soak into the surrounding earth. A tile pipe 33 likewise passes through the outer wall of compartment 18 to the outer zone 24. A similar pipe 34 leading outwardly from the compartment 23 is provided with a T-shaped portion, one end of which projects downwardly into the zone 24 and the other to a second tank if the same is to be employed.

I may, if desired, dig a supplemental pit 40 beneath the compartment 23 and place a cement pipe 41 therein, which has no bottom and rests directly on the earth. The upper end of this pipe is covered by the slab 42 of cement or the like and an iron pipe 43 having a downwardly turned goose neck serves for the egress of water from compartment 23 into the space within the pipe 41. The entrance of the pipe 43 is spaced from the cover 42 to prevent sand being admitted to the lower pit 40. This pipe 41 is filled with gravel or small pieces of stone.

It will therefore be seen from the above disclosure that sewage flowing into the apparatus through the pipe 28 circulates in the directions indicated by the arrows. It first remains quiescent in the sedimentation compartment 18 for the action of the bacteria thereon. When this tank is full, it overflows both into the compartment 23 formed in the other half of the tank and directly through the pipe 33 into the outer zone 24. It also flows from compartment 23 through the pipe 34 into the outer zone as well as through the wire fabric 21 into the gravel filled space between the blocks 19. The liquid will also pass through the pipe 43 into the gravel filled space within the pipe 41. By this construction I provide not only an impervious tank for the purification of the sewage but a very large area of contact with the surrounding earth so that water may be carried off in substantially every direction through the adjacent territory.

Figure 3:
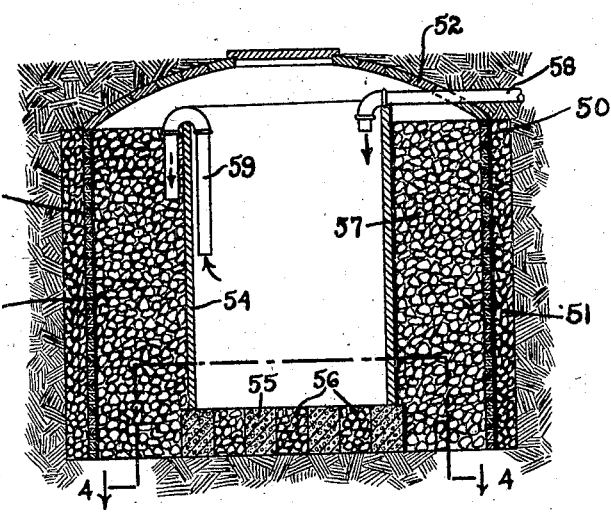
Fig. 3 shows a modification of my invention in a vertical cross sectional view.
Figure 4:
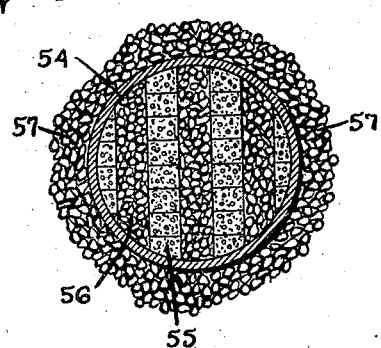
Fig. 4 is a sectional view on the line 4—4 of Fig 3.

In the modification shown in Figs. 3 and 4, the outer tank walls 50, which are preferably made of my L-shaped blocks, are provided with holes or large pores therethrough for conducting water into the gravel filled pit 51 which surround the tank walls. A suitable arch shaped cover 52 is provided over the tank as described in connection with Fig. 1. I form the sedimentation chamber for bacterial action by providing a cylindrical wall 54 of impervious material such as concrete, which rests preferably on spaced rows of concrete blocks 55 as shown particularly in Fig. 4. The spaces between these blocks are filled with gravel 56. Similarly the annular space 57 between the two concentric walls 50 and 54 is preferably filled with gravel. An inlet pipe 58 carries the sewage into the inner compartment and a goose necked pipe 59 carries the purified water therefrom into the outer annular space, whence it soaks away both downwardly into the earth which forms the bottom of the pit as well as laterally through the porous blocks which make up the outer wall and into the gravel filled spaces outside of the same.

Figure 5:
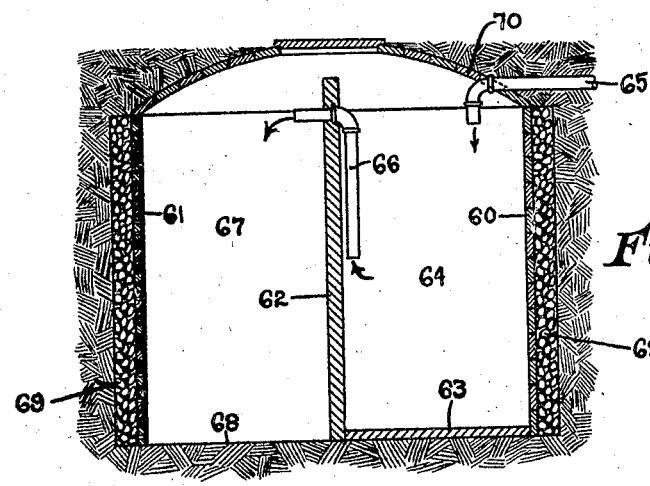
Fig. 5 is a vertical cross section of a still further modification.

In the modification shown in Fig. 5, I provide a very simple septic tank in which the L-shaped blocks 60 forming the right hand side of the tank are impervious and the L-shaped blocks 61 at the left are porous or provided with perforations. A diametrically disposed impervious partition 62 similar to the partition 16 shown in Fig. 1 and an impervious cement floor 63 combining with the blocks 60 form an impervious settling tank 64 for the bacterial action. Water flowing through the inlet pipe 65 passes from this tank through the tile pipe 66 into the left hand compartment 67 of the tank, thence it soaks away both directly into the earth 68 at the bottom of this compartment as well as through the porous blocks 61 into the gravel filled space 69 which completely surrounds the tank walls and fills the vertical channels between the downwardly projecting legs of the concrete blocks. A suitable arched shaped cover 70 is likewise provided for this form of tank.

It will therefore be seen that I have provided a simple construction for the disposal of sewage and that by providing gravel filled channels outside of the tank as well as by filling the available spaces beneath the tank with gravel I insure that the water will soak away quickly into the ground and that the various pipes and channels will not become clogged with solid matter. This construction furthermore provides an impervious walled tank chamber for prolonged bacterial action upon the sewage until it has been completely digested. This tank chamber overflows into the space on the opposite side of the partition which serves as a reservoir communicating directly with the surrounding porous earth. The level of the fluid in the septic tank remains at a constant level while the level of the fluid in the reservoir may vary depending upon the amount of water flowing into the tank. Hence, the tank reservoir and the outer annular gravel filled zone provide a large space which will take care of excessive amounts of water flowing into the tank and permit the water to seep away during periods when the amount of incoming water is at a minimum.

Having thus described my invention, what I claim as new and desire to secure by Letters Patent is:—

1. A sewage disposal apparatus comprising a septic tank located in an earth pit and surrounded by an annular gravel filled zone which communicates directly with the adjacent earth, an impervious partition dividing the tank in two compartments, the wall on one side of the partition being impervious, a floor cooperating with said partition and impervious wall to form a bacterial digestion chamber, the tank wall on the other side of the partition having openings therethrough to said zone and forming a storage reservoir, a cover for the tank, means for introducting sewage into the digestion chamber, and means providing an overflow passage from said chamber to the reservoir.

2. A septic tank comprising an enclosing wall set in an earth pit and having outwardly projecting ribs, the spaces between which form a transfusion zone, an impervious wall within the tank cooperating therewith to form a digestive chamber and a reservoir, said reservoir being adapted to receive the overflow from said chamber and communicating with the outer zone.

3. A septic tank comprising a wall of L-shaped blocks arranged with the legs projecting outwardly to form vertical channels adapted to be filled with gravel, means cooperating with said tank wall to form a digestive chamber and a reservoir therein, said tank being constructed to permit fluid to enter said chamber, overflow into said reservoir and have free passage to said channels.

4. A sewage tank disposed in an earth pit and comprising a wall of L-shaped blocks having legs projecting outwardly and forming a space between the tank wall and the pit, a portion of the blocks having openings therethrough which permit fluid to pass from within the tank to the outer space.

5. A sewage tank disposed in an earth pit and comprising a wall of L-shaped blocks having legs projecting outwardly and forming a space between the walls of the tank and the pit, a partition and a floor cooperating with said tank wall to form a digestion chamber on one side of the partition which overflows into a reservoir on the other side, the outer wall of the reservoir providing a passage for fluid to flow to the outer space.

6. A sewage tank disposed in an earth pit and comprising a wall having outwardly projecting ribs, the space adjacent which forms a transfusion zone, a partition within the tank cooperating with the wall to form a digestion chamber on one side which overflows into a reservoir on the other side, the outer wall of the reservoir having openings therethrough whereby fluid may pass to the zone adjacent said ribs.

7. A sewage tank comprising an outer wall, a vertical partition within the tank and a raised floor on one side of the partition forming with said wall a digestion chamber, the space on the other side of the partition and beneath the floor forming an overflow reservoir which communicates with the adjacent earth.

8. A sewage tank in an earth pit comprising an outer wall, a partition and a raised floor on one side of the partition which form a digestion chamber on one side and a reservoir on the other, the reservoir having a perforated outer wall and communicating with the space beneath the floor and the surrounding earth for transfusing thereto.

9. A septic tank comprising a wall L-shaped blocks having outwardly projecting legs, a cover thereover, a solid partition dividing the tank into two compartments, the walls and floor of one being solid and forming a digestion chamber, the other compartment being arranged to receive the overflow from the chamber and to communicate directly with the earth beneath and having its outer wall perforated for the flow of liquid therethrough, and an outer annular gravel filled zone surrounding said tank adjacent the projecting legs.

10. A septic tank comprising an outer wall surrounding by a gravel filled zone, a cover thereover, a partition dividing the tank into two compartment, a solid floor for one compartment and forming with the wall and partition a digestion chamber, separated foundation stones supporting said wall and floor and having gravel disposed therebetween, the compartment on the opposite side of the partition having a perforated wall opening into said zone, and communicating with the adjacent earth at its bottom and beneath said floor and means permitting entrance of fluid to said chamber and its overflow into the adjacent compartment.

11. A sewage disposed tank located in an earth pit comprising a wall having outwardly projecting ribs forming vertical channels adapted to be filled with gravel and form a transfusion zone, a cover over the tank, a wall cooperating with the ribbed wall to divide the tank into a digestion chamber and a reservoir, the walls and floor of said chamber being solid, the bottom and the ribbed wall of the reservoir being pervious and providing passage from the reservoir to said zone and earth, and means providing a sewage inlet to said chamber and an overflow therefrom to the reservoir for transfusion of liquid to the surrounding earth.

Signed at Port Jefferson Station, New York, this 28 day of Nov. 1922.

HANS JOHNSON.

Certificate of Correction.

It is hereby certified that in Letters Patent No. 1,470,745, granted October 16, 1923, upon the application of Hans Johnson, of Port Jefferson Station, New York, for an improvement in "Sewage-Disposal Apparatus," errors appear in the printed specification requiring correction as follows: Page 3, line 29, claim 1, for the misspelled word "introducting" read *introducing*; same page, line 96, claim 8, after the word "transfusing" insert the word *Liquid;* same page, line 111, claim 10, for the word "surrounding" read *surrounded*, and line 113, for the word "compartment" read *compartments;* same page, line 125, claim 11, for the word "disposed" read *disposal;* and that the said Letters Patent should be read with these corrections therein that the same may conform to the record of the case in the Patent Office.

Signed and sealed this 27th day of November, A. D., 1923.

[SEAL.]

KARL FENNING,
*Acting Commissioner of Patents.*